(12) United States Patent
Van Herpen et al.

(10) Patent No.: US 8,382,339 B2
(45) Date of Patent: Feb. 26, 2013

(54) LIGHT OUTPUT DEVICE

(75) Inventors: Maarten Marinus Johannes Wilhelmus Van Herpen, Eindhoven (NL); Roel Penterman, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 330 days.

(21) Appl. No.: 12/741,055

(22) PCT Filed: Oct. 30, 2008

(86) PCT No.: PCT/IB2008/054512
§ 371 (c)(1),
(2), (4) Date: May 3, 2010

(87) PCT Pub. No.: WO2009/060356
PCT Pub. Date: May 14, 2009

(65) Prior Publication Data
US 2010/0265707 A1 Oct. 21, 2010

(30) Foreign Application Priority Data
Nov. 9, 2007 (EP) .................................... 07120355

(51) Int. Cl.
*F21V 14/00* (2006.01)

(52) U.S. Cl. ........................................ 362/318; 362/235

(58) Field of Classification Search ................... 362/318
See application file for complete search history.

(56) References Cited

U.S. PATENT DOCUMENTS

| | | | | |
|---|---|---|---|---|
| 2,412,379 | A | * 12/1946 | Abramson | ............... 362/311.06 |
| 6,056,421 | A | 5/2000 | Johnson | |
| 6,097,530 | A | 8/2000 | Asher et al. | |
| 6,165,389 | A | 12/2000 | Asher et al. | |
| 6,428,811 | B1 * | 8/2002 | West et al. | ..................... 424/497 |
| 6,527,411 | B1 * | 3/2003 | Sayers | ........................... 362/245 |
| 6,756,217 | B1 | 6/2004 | Dave et al. | |
| 7,455,444 | B2 * | 11/2008 | Chien | ........................... 362/643 |
| 7,556,404 | B2 * | 7/2009 | Nawashiro et al. | ........... 362/293 |
| 2007/0110378 | A1 * | 5/2007 | Zarian | ........................... 385/125 |
| 2011/0050098 | A1 * | 3/2011 | Lenk et al. | ..................... 362/362 |

FOREIGN PATENT DOCUMENTS

| | | |
|---|---|---|
| JP | 58179256 | 10/1993 |
| JP | 10316453 | 12/1998 |
| WO | 2007043973 A1 | 4/2007 |
| WO | 2007077239 A1 | 7/2007 |

* cited by examiner

Primary Examiner — Alan Cariaso
(74) Attorney, Agent, or Firm — Mark L. Beloborodov

(57) ABSTRACT

A light output device comprises at least one light source having a light source output comprising at least a light output, and a switchable member through which the light output is provided, and which is switchable between at least two optical states. These at least two optical states provide different levels of uniformity of the light output. The switching of the switchable member is induced by the light source output.

16 Claims, 5 Drawing Sheets

LIGHT OUTPUT DEVICE

FIELD OF THE INVENTION

This invention relates to light output devices, particularly but not exclusively using discrete light sources associated with a transparent substrate structure.

BACKGROUND OF THE INVENTION

Figure 1:
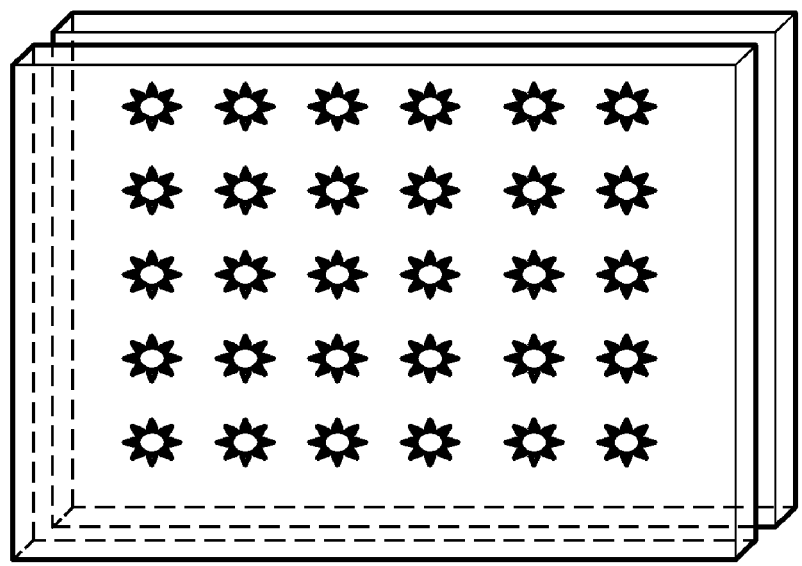

One known example of this type of lighting device is a so-called "LED in glass" device. An example is shown in FIG. 1. Typically a glass plate is used, with a transparent conductive coating (for example ITO) forming electrodes. The conductive coating is patterned in order to make the electrodes that are connected to a semiconductor LED device. The assembly is completed by laminating the glass, with the LEDs inside a thermoplastic layer (for example polyvinyl butyral, PVB).

Applications of this type of device are shelves, showcases, facades, office partitions, wall cladding, and decorative lighting. The lighting device can be used for illumination of other objects, for display of an image, or simply for decorative purposes.

One problem with this type of device is that semiconductor LEDs are point sources. As a result, the LEDs appear as bright dots of light, which is not always preferred, and does not give uniform illumination.

The device is transparent when it is not illuminated, and this is a desired feature. It has been proposed to provide a scattering function within the structure, so that the point source illumination is made diffuse. However, this affects the transparency of the structure in the non-illuminating state, which is undesirable.

SUMMARY OF THE INVENTION

According to a first aspect of the invention, there is provided a light output device comprising:
at least one light source having a light source output comprising at least a light output; and
a switchable member through which the light output is provided, and which is switchable between at least two optical states, wherein the at least two optical states provide different levels of uniformity of the light output,
wherein the switching of the switchable member is induced by the light source output.

The invention thus provides an arrangement in which a switchable member, e.g. a switchable layer, is used, and in which the light uniformity is related to the proximity to the light source. In particular, the light source output controls/induces the switching, namely without any direct electrical control system.

Preferably, the different levels of uniformity are provided by introducing different levels of light scattering, so that a switchable scattering layer is used, and in which the amount of scattering is related to the proximity to the light source. In particular, the light source output controls the switching, namely without any direct electrical control system.

The device may comprise first and second substrates between which the light source is provided and an electrode arrangement provided between the first and second substrate arrangements and comprising at least semi-transparent electrodes. The at least one light source is electrically driven by the electrodes. When LEDs are used as the light source, this defines a so-called LED in glass device.

For LEDs in glass, the system remains transparent when applied to the entire glass plate. When the LEDs are switched on, scattering is introduced locally, only near the LEDs.

The switchable layer may comprise a hydrogel. Selected hydrogels can become scattering when heated to a certain temperature. Because the heat is highest near the light source, the hydrogel is only scattering in the proximity of the light source.

The hydrogel can have a transition temperature in the range 25° C. to 50° C. If the intrinsic transition temperature of the hydrogel is not as desired, the hydrogel can be co-polymerized with a hydrophilic monomer for increasing the transition temperature or with hydrophobic monomers for reducing the transition temperature.

In one example, the hydrogel comprises N-isopropylacrylamide and a photoinitiator.

For example, the hydrogel can comprise:
9.9 wt % N-isopropylacrylamide;
0.1 wt % diethyleneglycoldiacrylate;
1 wt % Irgacure 2959 photoinitiator; and
89 wt % deionized water.

The switching of the switchable layer can thus be controlled by the heat of the light source output. However, the invention can be applied to arrangements in which a material is optically responsive to the light output, rather than thermally responsive. Other actuation methods can also be used, for example a material which is responsive to a particular wavelength.

The device can comprise an array of light sources, with each light source of the array associated with and controlling a local portion of the switchable layer. Each light source can comprise a discrete LED device or group of LED devices.

The scattering carried out by the switchable layer increases the level of uniformity of the light. Thus, a higher level of uniformity of the light is to be understood to mean a more uniform light output over a given area.

The invention also provides a method of providing a light output comprising:
generating a light source output from at least one light source, the light source output comprising at least a light output;
providing the light output through a switchable member which is switchable between at least two optical states, wherein the at least two optical states provide different levels of uniformity of the light output; and
inducing switching of the switchable member by the light source output.

It is noted that the invention relates to all possible combinations of features recited in the claims.

BRIEF DESCRIPTION OF THE INVENTION

Figure 2:
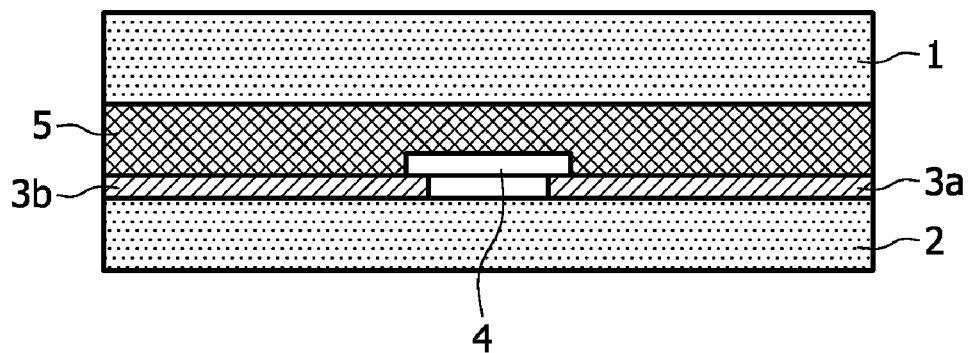
Figure 3:
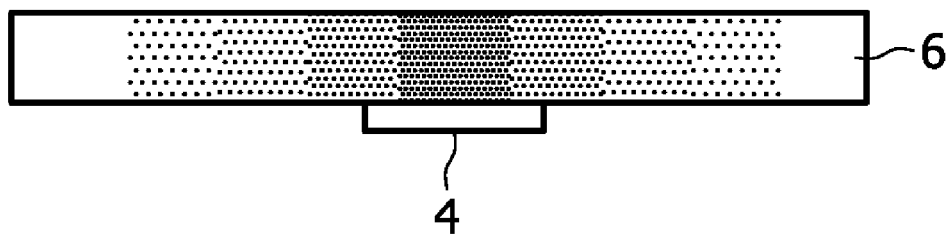
Figure 4:
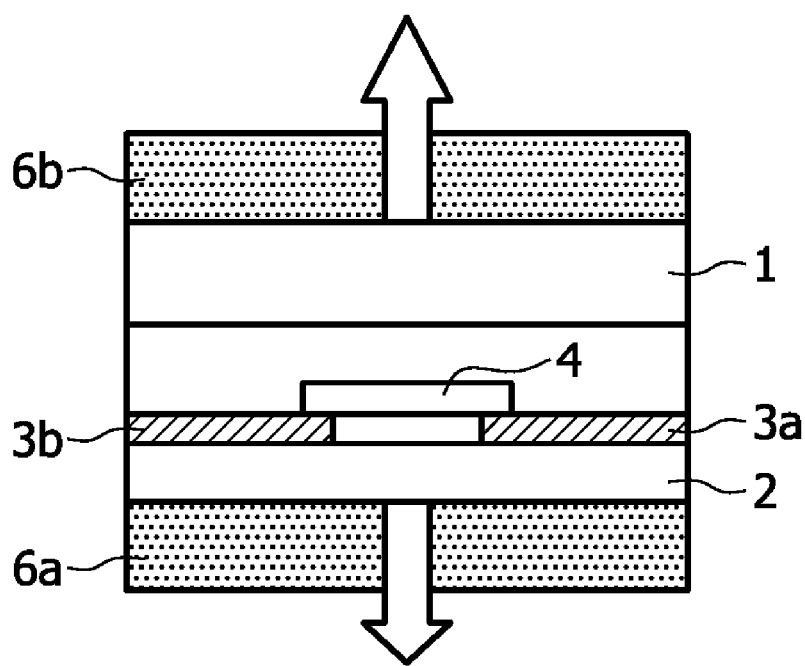
Figure 5A:
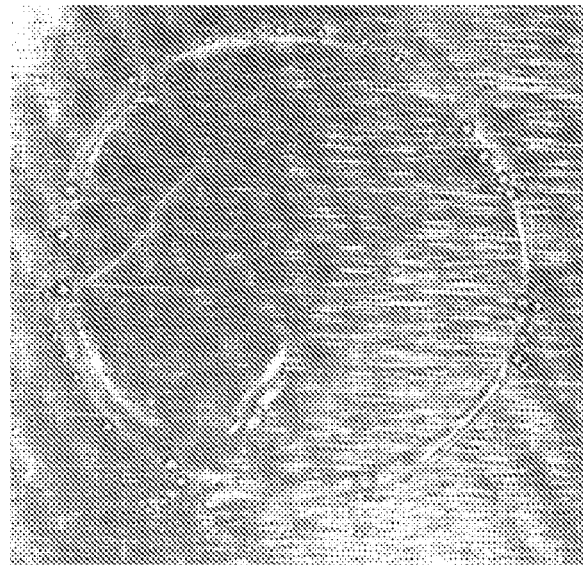
Figure 5B:
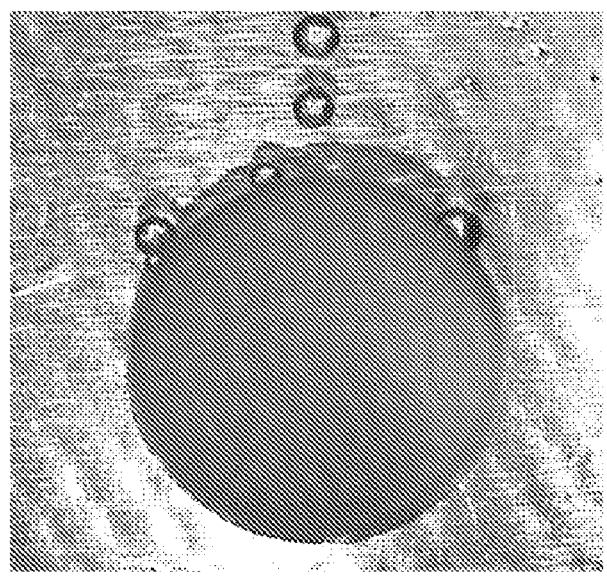
Figure 6:
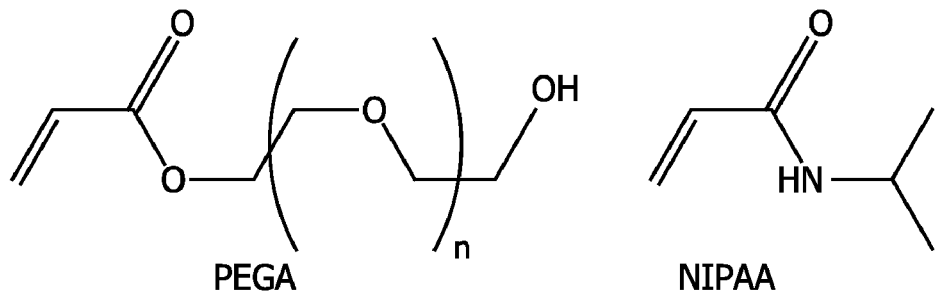
Figure 6:
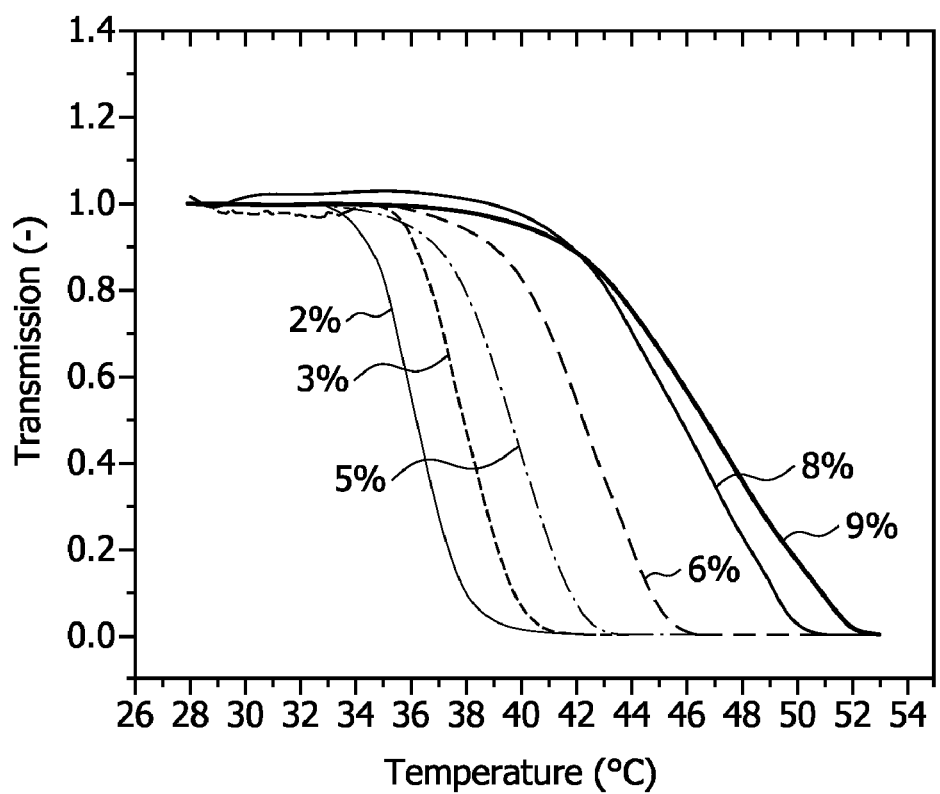
Figure 7:
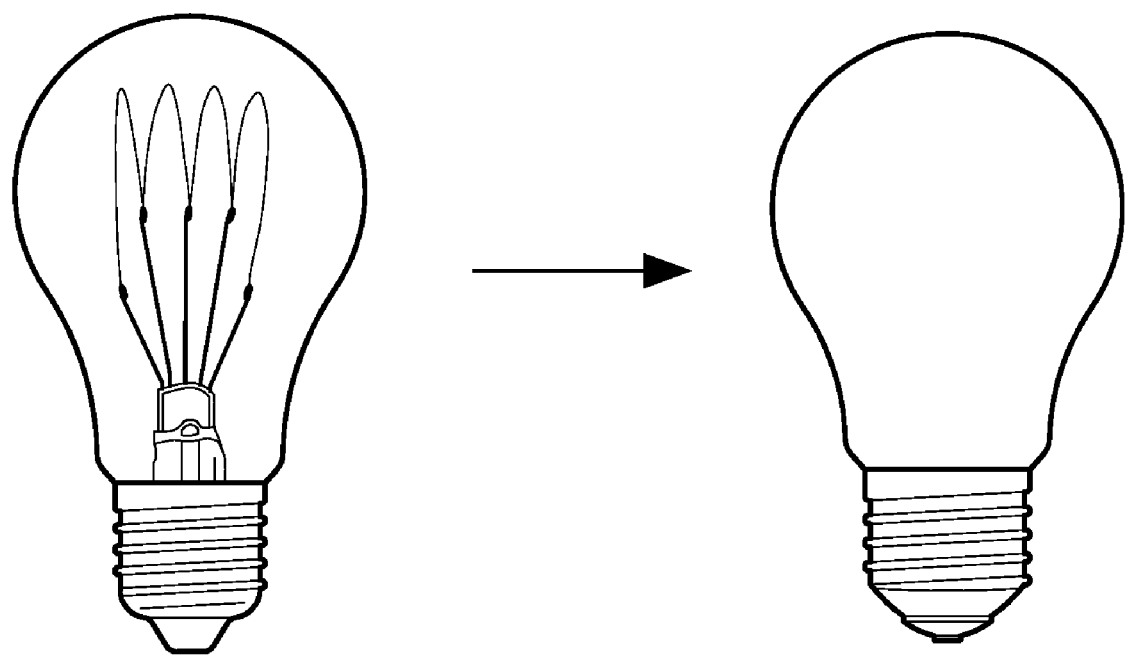

Examples of the invention will now be described in detail with reference to the accompanying drawings, in which:
FIG. 1 shows a known LED in glass illumination device;
FIG. 2 shows an example of the structure of the device of FIG. 1;
FIG. 3 shows schematically the concept underlying the invention;
FIG. 4 shows a first example of light output device of the invention;
FIGS. 5a and 5b show how a p-NIPAAm hydrogel changes characteristics with temperature;
FIG. 6 shows how the switching characteristics of a switching layer used in the device of FIG. 4 can be tuned; and
FIG. 7 shows a second example of light output device of the invention.

The same reference numerals are used to denote similar parts throughout the figures.

DETAILED DESCRIPTION OF THE EMBODIMENTS

FIG. 2 shows a known LED in glass structure. The light output device comprises glass plates 1 and 2. Between the glass plates are (semi-) transparent electrodes 3a and 3b (for example formed using ITO or thin conductive wires), and a LED 4 connected to the transparent electrodes 3a and 3b. A layer of thermoplastic material 5 is provided between glass plates 1 and 2 (for example PVB or UV resin).

When transparent electrodes are used, they are not visible to the viewer, and they do not introduce non-uniformities to the light output.

The electrodes are preferably substantially transparent, by which is meant that they are imperceptible to a viewer in normal use of the device. If the conductor arrangement does not introduce a noticeable variation in light transmission (for example because it is not patterned, or because the pattern cannot be seen), a transparency of greater than or equal to 50% may be sufficient for the system to appear transparent. More preferably, the transparency is greater than 70%, more preferably 90%, and even more preferably 99%. If the conductor arrangement is patterned (for example because thin wires are used), the transparency is preferably greater than 80%, more preferably 90%, but most preferably greater than 99%.

The electrodes can be made of a transparent material such as ITO or they can be made of an opaque material such as copper but be sufficiently thin so that they are not visible in normal use. Examples of suitable materials are disclosed in U.S. Pat. No. 5,218,351.

A particularly useful opaque conductive material may be a conductive ink deposited using silkscreen or inkjet printing, because this allows the conductor arrangement to be deposited in a cost-effective manner.

The glass plates typically may have a thickness of 1.1 mm-2.1 mm. The spacing between electrode is typically 0.01-3 mm, for example around 0.15 mm. The thermoplastic layer has a thickness of 0.5 mm-2 mm, and the electrical resistance of the electrodes is in the range 1-80 Ohm, or 1-50 Ohm or more preferably 2-20 Ohm, or 10-30Ohms/square.

The invention provides a light output device in which a light output is provided through a switchable member which is switchable between (at least) two optical states, wherein the at least two optical states provide different levels of uniformity of the light output. For example, the different levels of uniformity can be provided by introducing different levels of light scattering. One of these states can be a substantially transparent state, and one can be a scattering state, in which the light output is made more diffuse. This can be used in a number of applications, for example to convert the point source illumination provided by an LED into a more uniform light output over a larger area. The switching of the switchable member is induced/controlled by the light source output. This means that a separate conductor pattern is not required for the switchable member, as it responds to for example a thermal or optical stimulus from the light source itself.

FIG. 3 shows the basic principle underlying the invention, and shows a light source in the form of an LED 4 adjacent a switchable layer 6. The scattering layer 6 is provided in the light output path, and as shown schematically in FIG. 3, the switching response (represented by different shades of grey) is dependent on the distance from the light source 4. The switching of the layer 6 is a local effect, and it is the result of thermal or optical interaction between the light source output and the material of the layer 6. Suitable materials are discussed below.

FIG. 4 shows a first example of application of the invention to the type of structure shown in FIG. 2.

In addition to the layers shown in FIG. 2, two switchable scattering layers 6a and 6b are shown, on the outsides of the substrates 1,2.

When the LED 4 is turned on, the switchable scattering layer becomes scattering depending on the distance between the LED 4 and the portion of the scattering layer. Preferably, the layer 6 becomes scattering when it is near the LED, such that light emitted by the LED is distributed over a larger area due to scattering in the layer 6, which responds to the light or heat produced by the LED. The use of a scattering layer both above and below the LED makes the light distribution more uniform.

The structure of FIG. 4 can be used for an individual light source, or it can be used for an array of light sources, of the type shown in FIG. 1.

The arrangement of the invention enables the device to be kept substantially transparent when turned off, but also enables the light emission to be made more uniform. The uniformity of the light intensity distribution is effectively improved by using a diffuser with a variation in scattering efficiency, the amount of scattering being chosen to be greater immediately opposite the location of the LED than at a further distance from the LED.

The arrangement of the invention localizes the scattering effect immediately opposite the location of the LEDs without requiring electrical control mechanisms to achieve this, and the effect will also automatically cease when the LED is turned off.

In a particularly advantageous embodiment the layers 6a, 6b respond to heat generated by the LED 4. Because the heat is substantially located in the area surrounding the LED, the layers 6a, 6b will become scattering exactly in the location where it is preferred to be scattering. Simultaneously, when the LED is turned off, the glass substrate will cool down and the scattering effect will disappear, making the system transparent again.

The scattering material can comprise a thermally responsive hydrogel.

An example of a temperature-responsive polymer is poly (N-isopropylacrylamide), which undergoes a sharp coil-globule transition in water at 32° C., changing from a hydrophilic state below this temperature to a hydrophobic state above it. The phase transition, from a coil structure to a globule structure, arises from the entropic gain as water molecules associated with the side-chain isopropyl moieties are released into the bulk aqueous phase as the temperature increases past a critical point. The temperature at which this occurs (the Lower Critical Solution Temperature or LCST) corresponds to the region in the phase diagram at which the enthalpic contribution of water hydrogen-bonded to the polymer chain becomes less than the entropic gain of the system.

The LCST is largely dependent on the hydrogen-bonding capabilities of the constituent monomer units. Accordingly, the LCST of a given polymer can be "tuned" as desired by variation in hydrophilic or hydrophobic co-monomer content.

When stimuli responsive polymers are crosslinked, stimuli responsive hydrogels can be obtained. A polymer hydrogel is a water-containing, but water-insoluble polymer, whose molecules are chemically (by covalent or ionic bonds) or physically (by entanglements in polymer chains) linked to a three dimensional network. By means of inserted hydrophilic polymer components they swell in water to extensive volume growth, without losing their material co-operation. A crosslinked network of PNIPAAm thus swells in an aqueous environment if the temperature is below its transition state and the network will contract above this temperature. This response changes the optical properties of the gel: FIG. 5a shows the hydrogel below the LCST and FIG. 5b shows the hydrogel above the LCST. Above the LCST, water separates from the polymer chains and small water droplets are formed inside the gel.

This random structure of dispersed water droplets in the polymer, with both phases having a different index of refraction, scatters the incident light.

A first example of a suitable hydrogel based on poly-N-isopropylacrylamide (p-NIPAAm) can be made from a monomer mix containing:

9.9 wt % N-isopropylacrylamide
0.1 wt % diethyleneglycoldiacrylate
1 wt % Irgacure 2959 photoinitiator
89 wt % deionized water.

This mixture can be introduced in a cell made from two glass substrates with approximately a 1 mm gap. The hydrogel is exposed to UV-light (for example 3 mW/cm$^2$, 15 minutes) to polymerize the hydrogel. To facilitate heat transport and to provide sufficient optical coupling, silicon oil can be used to couple to the discrete LED device to the substrate arrangement.

This hydrogel has a transition temperature of approximately 32° C. As explained above, this transition temperature can be changed by co-polymerizing the N-isopropylacrylamide monomers with hydrophilic monomer (the transition temperature then goes up) or with hydrophobic monomers (the transition temperature then goes down).

To decrease the turbidity of the switchable scattering layer, the cell gap can be reduced, for example down to e.g. 0.1 µm.

The arrangement above has been tested, and shows that the hydrogel layer is clear before the LED is turn on. The LED device is then just visible as a discrete element within the otherwise transparent substrate arrangement. When the LED is turned on, the hydrogel layer becomes warm and starts to scatter the light, making the light output homogeneous within a circle surrounding the LED. After turning off the LED, the layer cools down and is again clear.

The switchable layer may also respond to other effects that depend on the distance to the LED.

For example, the layer 6a, 6b may respond to the local light intensity, which may be achieved using a gel comprising particles of a non-linear optical material, for which the index of refraction depends on the local light intensity.

Another example is the use of photochromic materials. The glass may achieve the desired photochromic property through the embedding of microcrystalline silver halides (usually silver chloride), or molecules.

As yet another example, the layer 6a, 6b may respond to electromagnetic radio waves, generated by pulse-width modulation of the LED. An example is an electrochromic material, which can respond to charge induced by the radio waves.

The hydrogel outlined above has a transition temperature of approx. 32° C. As mentioned above, this transition temperature can be changed by co-polymerizing the N-isopropylacrylamide monomers with hydrophilic or hydrophobic monomers.

FIG. 6 shows the optical transmission of hydrogels of the composition outlined above, in which the hydrogel has been mixed with various amounts (ranging from 2% to 9% as shown) of Poly-(ethyleneglycol)acrylate (PEGA). The temperature at which the gel starts to scatter becomes higher when the amount of PEGA monomers in the hydrogel mix is increased.

As an alternative material, a non-crosslinked temperature response polymer (single polymer chains) is dissolved in water. An example is 1-10% poly-(N-isopropylacrylamide) in water. Increasing the amount of polymer increases the amount of scattering. The advantage of this method is that the liquid can flow towards and away from the LED induced by convection, helping to cool the LED. Additionally, the scattering effect can be larger, because the heat may be conducted better away from the LED and because scattering particles may travel away from the LED.

The invention has particular benefit for LED light sources, as these have point source light output. However, the invention can be applied to other types of light source. By way of example, FIG. 7 shows an application of the invention to an incandescent lamp. The lamp has a double-wall glass structure, with the switchable material (the hydrogel) embedded between the glass walls. When the lamp is turned off, it will be clear, and the structure on the inside can be seen. However, when the lamp is turned on, the responsive material switches to a scattering state, making the light output more homogeneous.

The advantage of this embodiment is that the lamp looks attractive when switched off, but it still has a homogeneous output when turned on.

In the examples above, a single LED is shown. However, the LEDs may be in groups of LEDs.

The switchable hydrogel layer may be positioned closer to the LED, for example, above the LED and underneath the top glass plate, to improve the scratch resistance of the devices. Alternatively, extra glass plates can be applied on the outside of the stack shown in FIG. 4.

Only one example of hydrogel has been given above. However, there are many other examples of hydrogel which respond in the desired manner. The hydrogel material may based on thermo-responsive monomers selected out of the group comprising:

N-isopropylacrylamide, di(m)ethylacrylamide, carboxyisopropylacrylamide, hydroxymethylpropylmethacrylamide, acryloylalkylpiperazine, N-vinylcaprolactam;

and copolymers thereof with monomers selected out of the group hydrophilic monomers comprising: hydroxyethyl (meth)acrylate, (meth)acrylic acid, acrylamide, polyethyleneglycol(meth)acrylate, N-vinyl pyrolidone, dimethylaminopropylmethacrylamide, dimethylaminoethylacrylate, N-hydroxymethylacrylamide or mixtures thereof;

and/or co-polymerized with monomers selected out of the group of hydrophobic monomers, comprising (iso)butyl (meth)acrylate, methylmethacrylate, isobornyl(meth)acrylate, glycidyl methacrylate or mixtures thereof. These co-polymers are known to be thermo-responsive and therefore may be of use for a wide range of applications within the present invention.

Various other possibilities are within the scope of the various aspects of the invention, as defined by the attached claims.

Various other modifications will be apparent to those skilled in the art.

The invention claimed is:
1. A light output device comprising:
a first substrate and a second substrate;
at least one light source having a light source output provided between the first and the second substrates;

an electrode arrangement comprising at least partially transparent electrodes provided between the first and the second substrates for driving the at least one light source; and a switchable member through which the light output is provided, and which is switchable between at least two optical states, wherein the at least two optical states provide different levels of uniformity of the light output, wherein the switching of the switchable member is induced by heat emitted by the light source.

2. A device as claimed in claim 1, wherein the different levels of uniformity are provided by introducing different levels of light scattering.

3. A device as claimed in claim 1, wherein the light source provides a light output through the first substrate.

4. A device as claimed in claim 1, wherein the switchable member comprises a hydrogel.

5. A device as claimed in claim 4, wherein the hydrogel has a transition temperature in the range 25° C. to 50° C.

6. A device as claimed in claim 4, wherein the hydrogel is co-polymerized with a hydrophilic monomer for increasing the transition temperature or with hydrophobic monomers for reducing the transition temperature.

7. A device as claimed in claim 4, wherein the hydrogel comprises N-isopropylacrylamide and a photoinitiator.

8. A device as claimed in claim 7, wherein the hydrogel comprises:
   9.9 wt % N-isopropylacrylamide;
   0.1 wt % diethyleneglycoldiacrylate;
   1 wt % Irgacure 2959 photoinitiator; and
   89 wt % deionized water.

9. A device as claimed in claim 1, comprising an array of light sources.

10. A device as claimed in claim 9, wherein each light source of the array is associated with and controls a local portion of the switchable member.

11. A device as claimed in claim 1, wherein the light source comprises an LED device.

12. A device as claimed in claim 1, wherein the light source comprises a group of LED devices.

13. A method of providing a light output comprising:
   generating a light source output from at least one light source;
   directing the light output through a switchable member which is switchable between at least two optical states, wherein the at least two optical states provide different levels of uniformity of the light output; and
   inducing switching of the switchable member by the heat emitted by the light source when generating light source output, wherein the switchable member comprises a hydrogel including N-isopropylacrylamide and a photoinitiator.

14. A light output device comprising:
   at least one light source having a light source output
   a switchable member through which the light output is provided, the switchable member comprising a hydrogel comprising N-isopropylacrylamide and a photoinitiator and being switchable between at least two optical states, wherein the at least two optical states provide different levels of uniformity of the light output, wherein the switching of the switchable member is induced by heat emitted by the light source.

15. The device as claimed in claim 14, wherein the light source comprises an LED device.

16. The device as claimed in claim 14, wherein the hydrogel has a transition temperature in the range 25° C. to 50° C.

* * * * *